US012353152B2

(12) United States Patent
Yoshikawa et al.

(10) Patent No.: US 12,353,152 B2
(45) Date of Patent: Jul. 8, 2025

(54) SHEET CHARACTERISTIC DETECTION DEVICE, IMAGE FORMING SYSTEM INCLUDING THE SAME, AND IMAGE FORMING APPARATUS

(71) Applicant: Konica Minolta, Inc., Tokyo (JP)

(72) Inventors: Hiroyuki Yoshikawa, Toyohashi (JP); Hitoshi Asano, Toyokawa (JP); Yumiko Izumiya, Hachioji (JP); Akimasa Ishikawa, Hino (JP); Yasuo Koyanagi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/504,625

(22) Filed: Nov. 8, 2023

(65) Prior Publication Data

US 2024/0160141 A1 May 16, 2024

(30) Foreign Application Priority Data

Nov. 15, 2022 (JP) ................................ 2022-182262

(51) Int. Cl.
*G03G 15/00* (2006.01)
*G03G 15/01* (2006.01)
(Continued)

(52) U.S. Cl.
CPC ..... *G03G 15/5037* (2013.01); *G03G 15/0142* (2013.01); *G03G 15/5029* (2013.01);
(Continued)

(58) Field of Classification Search
CPC ........... G03G 15/0142; G03G 15/5029; G03G 15/5037; G03G 15/6508; G03G 15/6511; G03G 15/6529; G03G 15/6538; G03G 15/6555; G03G 15/6558; G03G 15/6588; G03G 21/0047; G03G 21/1604; G03G 21/1619; G03G 21/1638; G03G 2215/00016; G03G 2215/00367; G03G 2215/00371; G03G 2215/004; G03G 2215/00409; G03G 2215/00531; G03G 2215/00556; G03G 2215/00565; G03G 2215/00734; G03G 2215/00763; G03G 2215/00886; G03G 2215/00919;
(Continued)

(56) References Cited

U.S. PATENT DOCUMENTS 4,235,548 A * 11/1980 Miyamoto ............. G03G 15/18
399/385
5,893,009 A * 4/1999 Yamada ................. G03G 15/65
399/45

(Continued)

FOREIGN PATENT DOCUMENTS

JP 6-124005 A 5/1994
JP 2005-181695 A 7/2005
JP 2021-196398 A 12/2021

*Primary Examiner* — Joseph S Wong
(74) *Attorney, Agent, or Firm* — RANKIN, HILL & CLARK LLP

(57) ABSTRACT

A sheet characteristic detection device includes: a detector that is disposed on a sheet ejection path through which a sheet is ejected and that detects an electrical resistance value of the sheet; and a charge neutralizer that is disposed on a downstream side of the detector on the sheet ejection path and that neutralizes electric charge on the sheet.

10 Claims, 8 Drawing Sheets

(51) Int. Cl.
*G03G 21/00* (2006.01)
*G03G 21/16* (2006.01)

(52) U.S. Cl.
CPC ..... *G03G 15/6508* (2013.01); *G03G 15/6511* (2013.01); *G03G 15/6529* (2013.01); *G03G 15/6538* (2013.01); *G03G 15/6552* (2013.01); *G03G 15/6555* (2013.01); *G03G 15/6558* (2013.01); *G03G 15/6588* (2013.01); *G03G 21/0047* (2013.01); *G03G 21/1604* (2013.01); *G03G 21/1619* (2013.01); *G03G 21/1638* (2013.01); *G03G 2215/00016* (2013.01); *G03G 2215/00367* (2013.01); *G03G 2215/00371* (2013.01); *G03G 2215/004* (2013.01); *G03G 2215/00409* (2013.01); *G03G 2215/00531* (2013.01); *G03G 2215/00556* (2013.01); *G03G 2215/00565* (2013.01); *G03G 2215/00734* (2013.01); *G03G 2215/00763* (2013.01); *G03G 2215/00886* (2013.01); *G03G 2215/00919* (2013.01); *G03G 2215/00924* (2013.01); *G03G 2221/0068* (2013.01); *G03G 2221/1672* (2013.01)

(58) Field of Classification Search
CPC . G03G 2215/00924; G03G 2221/0068; G03G 2221/1672; G03G 15/6552
See application file for complete search history.

(56) References Cited

U.S. PATENT DOCUMENTS

| | | | | |
|---|---|---|---|---|
| 2015/0210488 A1* | 7/2015 | Bradford | .................. | B65H 7/06<br>399/21 |
| 2022/0397858 A1* | 12/2022 | Sugiyama | ............ | G03G 21/203 |

* cited by examiner

SHEET CHARACTERISTIC DETECTION DEVICE, IMAGE FORMING SYSTEM INCLUDING THE SAME, AND IMAGE FORMING APPARATUS

The entire disclosure of Japanese patent Application No. 2022-182262, filed on Nov. 15, 2022, is incorporated herein by reference in its entirety.

BACKGROUND

Technological Field

The present invention relates to a sheet characteristic detection device, an image forming system including the same, and an image forming apparatus.

Description of the Related Art

As a prior art, JP 2021-196398 A will be described that discloses a configuration of an image forming apparatus. The image forming apparatus disclosed in JP 2021-196398 A includes a transfer device that transfers a toner image to a transfer surface of a sheet. The transfer device includes a resistance detector and a charge neutralizing member. The resistance detector detects an electrical resistance value on the surface of the sheet. The charge neutralizing member neutralizes electric charge on the sheet before the transferring process.

Examples of the prior arts disclosing the configuration similar to that of JP 2021-196398 include JP 2005-181695 and JP H06-124005.

Outside the configuration of forming an image, some apparatuses include a configuration that applies voltage to a sheet and measures an electrical resistance value thereof to detect sheet characteristics. In this case, when the sheet is ejected into a space in which the user can touch the sheet, there is a possibility that the user gets electric shock by touching the charged sheet.

SUMMARY

The present invention has been made in view of the foregoing, and it is an object of the present invention to provide a sheet characteristic detection device, an image forming system including the same, and an image forming apparatus that can prevent electric shock from occurring to a user touching a sheet when voltage is applied to the sheet to detect sheet characteristics.

To achieve the abovementioned object, according to an aspect of the present invention, a sheet characteristic detection device reflecting one aspect of the present invention comprises: a detector that is disposed on a sheet ejection path through which a sheet is ejected and that detects an electrical resistance value of the sheet; and a charge neutralizer that is disposed on a downstream side of the detector on the sheet ejection path and that neutralizes electric charge on the sheet.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
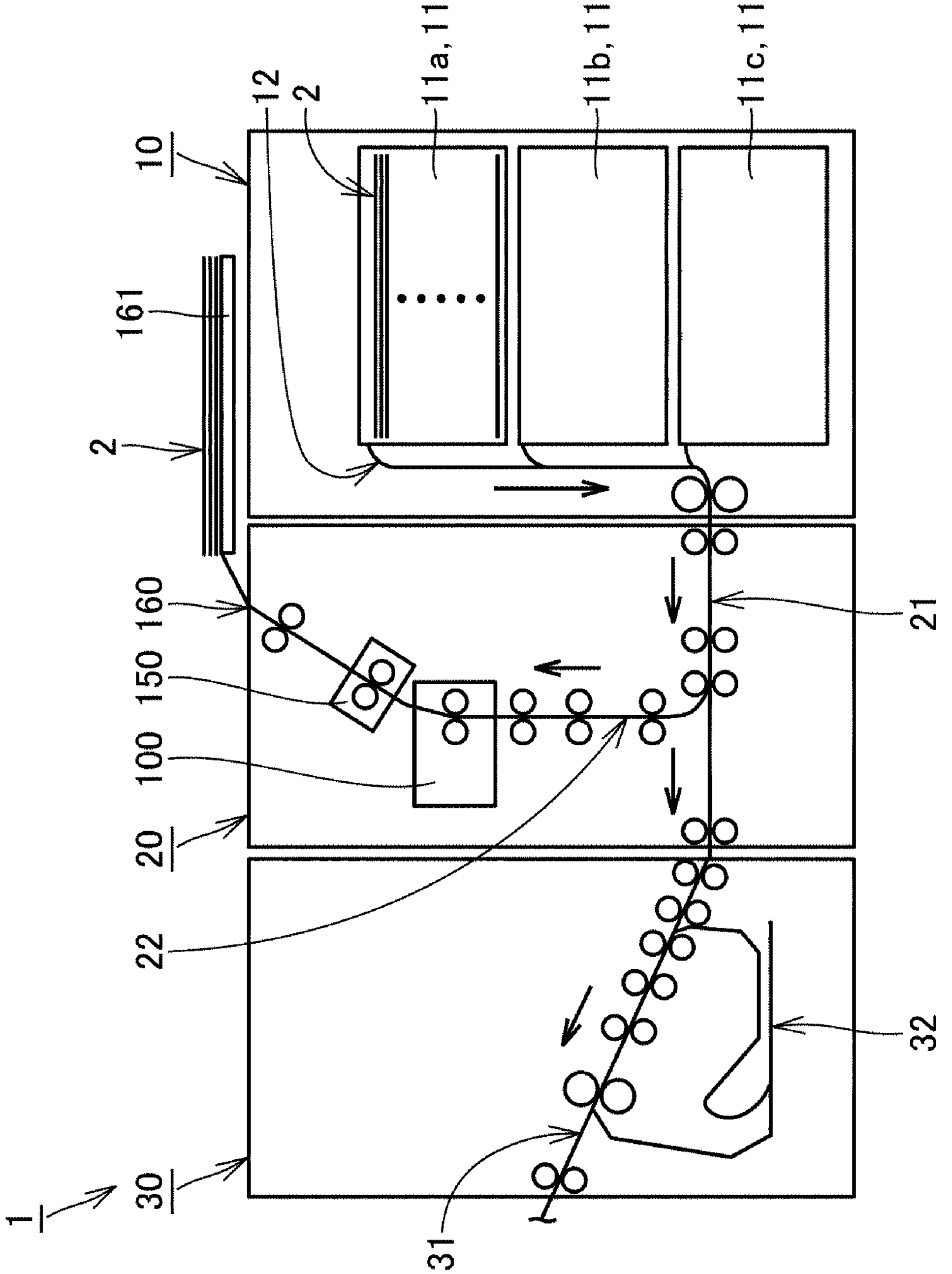
FIG. 1 is a schematic view illustrating a configuration of an image forming system according to a first embodiment of the present invention.

Hereinafter, a sheet characteristic detection device, an image forming system including the same, and an image forming apparatus according to one or more embodiments of the present invention will be described with reference to the drawings. However, the scope of the invention is not limited to the disclosed embodiments. In the following description of the embodiments, the same or corresponding parts in the drawings are denoted by the same reference numerals, and the description thereof will not be repeated.

First Embodiment

FIG. 1 is a schematic view illustrating a configuration of an image forming system according to a first embodiment of the present invention. As illustrated in FIG. 1, this image forming system 1 according to the first embodiment is a production printer for use in fields such as commercial printing and office printing.

The image forming system 1 can use plain paper sheets 2 as a recording medium. The plain paper may be roll paper in which long paper is wound in a roll shape, or may be paper sheets cut into a predetermined size. The sheets 2 according to the first embodiment include sheets, for example, in a plurality of sheet sizes such as A3 and A4. The recording medium may be a resin film. The resin film may be, for example, a polyethylene terephthalate (PET) film, a polypropylene (PP) film, or a polyethylene (PE) film. The recording medium may be made of, for example, metal, wood, or cloth.

The image forming system 1 according to the first embodiment includes a sheet feeding device 10, a sheet characteristic detection device 20, and an image forming apparatus 30. In the image forming system 1, a sheet 2 passes through the sheet feeding device 10, the sheet characteristic detection device 20, and the image forming apparatus 30, and a subject to be printed is printed on a surface of the sheet 2.

The sheet feeding device 10 feeds the sheet 2. The sheet feeding device 10 includes sheet feeding cassettes 11 and a sheet feeding path 12.

The sheet feeding cassettes 11 in the first embodiment include three sheet feeding cassettes 11*a*, 11*b*, and 11*c*. In each of the three sheet feeding cassettes 11*a*, 11*b*, and 11*c*, the same type of sheets may be stored, or different types of sheets may be stored.

The sheet feeding path 12 is part of the sheet path and is a path for feeding the sheet 2 to a downstream side from the sheet feeding cassettes 11. The sheet is fed through the sheet feeding path 12 by being sandwiched between sheet guides, which are not illustrated.

The sheet characteristic detection device 20 detects physical properties, such as electrical resistance, of the sheet 2 fed from the sheet feeding device 10. The sheet characteristic detection device 20 can determine, for example, the surface property of the sheet such as the type of the surface coating layer or the thickness of the sheet by detecting the physical properties of the sheet.

The sheet characteristic detection device 20 includes a first conveyance path 21 as a conveyance path in the sheet characteristic detection device, a sheet ejection path 22, a detector 100, a charge neutralizer 150, a sheet ejector 160, and an ejection tray 161.

The first conveyance path 21 is part of the sheet path and is a path for conveying the sheet 2 to the image forming apparatus 30. The sheet is fed through the first conveyance path 21 by being sandwiched between sheet guides, which are not illustrated.

The sheet ejection path 22 is part of the sheet path and is a path for ejecting the sheet 2 to the outside of the sheet characteristic detection device 20. The sheet ejection path 22 is separated from the first conveyance path 21 on an upstream side of the image forming apparatus 30. The sheet ejection path 22 directly communicates with an external space in which the user can touch the sheet 2 without passing through the image forming apparatus 30. The sheet ejection path 22 ejects a sheet while the sheet is sandwiched between sheet guides, which are not illustrated.

The detector 100 is disposed on the sheet ejection path 22 and detects an electrical resistance value of the sheet 2. The detector 100 can apply a high voltage to the sheet 2. The detector 100 detects an electrical resistance value of the sheet 2 by calculation based on Ohm's law using a detected current value upon application of a high voltage to the sheet 2.

The charge neutralizer 150 is disposed on a downstream side of the detector 100 on the sheet ejection path 22. The charge neutralizer 150 neutralizes the electric charge on the sheet 2.

As described above, the detector 100 and the charge neutralizer 150 are disposed outside the image forming apparatus 30. Since the detector 100 and the charge neutralizer 150 are disposed outside the image forming apparatus 30, it is possible to reduce the influence of the high voltage applied by the detector 100 on other sensors and the like disposed in the image forming apparatus 30.

The sheet ejector 160 is disposed at the end of the sheet ejection path 22. The sheet ejector 160 ejects the sheet 2 to the outside of the device.

The ejection tray 161 is provided at a destination to which the sheet 2 is ejected from the sheet ejector 160. The sheet 2 ejected from the sheet ejection path 22 is placed on the ejection tray 161. In the first embodiment, after the electrical resistance of the sheet 2 is detected at the detector 100, the sheet 2 passes through the charge neutralizer 150 and the sheet ejector 160, and is ejected to the ejection tray 161.

It is preferred that the detector 100 and the charge neutralizer 150 are disposed at the end of the sheet ejection path 22 with no other sensors or the like being disposed between the sheet ejector 160 and each of the detector 100 and the charge neutralizer 150. Compared with a case in which other sensors or the like are disposed on a downstream side of the detector 100 and the charge neutralizer 150 in the sheet ejection path 22, this configuration can reduce the influence of the high voltage applied by the detector 100 and brought by the charged sheet 2 by the detector 100 and the charge neutralizer 150 to the other sensors disposed on the downstream side.

The image forming apparatus 30 forms an image on the sheet 2. The image forming apparatus 30 includes a second conveyance path 31 and an image former 32.

The second conveyance path 31 is part of the sheet path and is a path for conveying the sheet 2 in the image forming apparatus 30. After the sheet 2 is conveyed through the second conveyance path 31 to the image former 32, a toner image is transferred to the sheet 2 at the image former 32. In this process, a subject to be printed is printed on a surface of the sheet 2.

Figure 2:
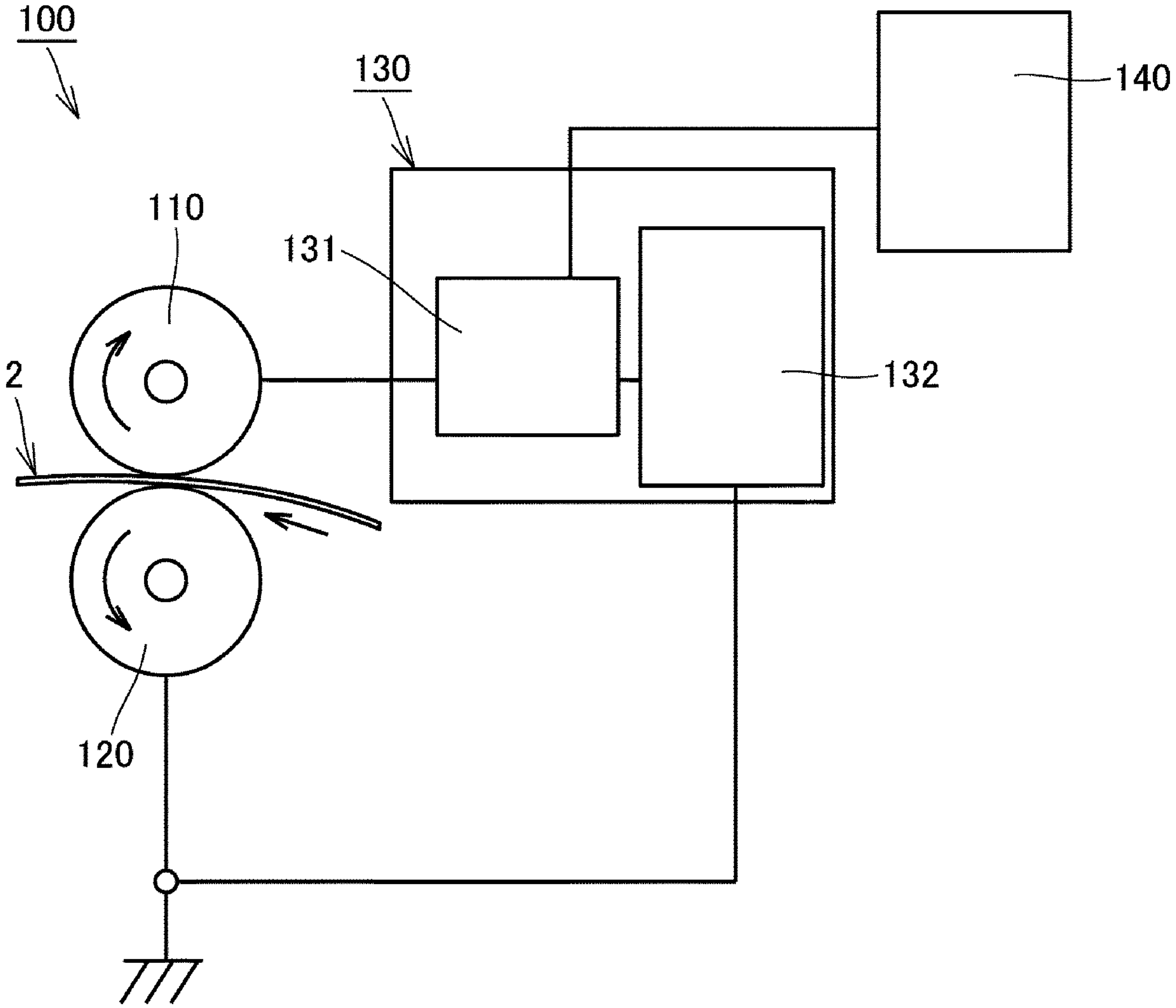
FIG. 2 is a schematic view illustrating a configuration of a detector of a sheet characteristic detection device included in the image forming system according to the first embodiment of the present invention.

FIG. 2 is a schematic view illustrating a configuration of the detector of the sheet characteristic detection device included in the image forming system according to the first embodiment of the present invention.

As illustrated in FIG. 2, the detector 100 includes a detection roller 110, a counter roller 120, a high-voltage power supply unit 130, and a controller 140.

The detection roller 110 is disposed to be contactable with first sheet surface side of the sheet 2. The detection roller 110 is made of, for example, an elastic material such as rubber having conductivity.

The counter roller 120 is disposed opposite to the detection roller 110 with the sheet 2 being interposed therebetween. The counter roller 120 is disposed to be contactable with second sheet surface side of the sheet 2. The counter roller 120 is made of, for example, a metal material. The counter roller 120 is grounded.

The high-voltage power supply unit 130 applies a high voltage to the sheet 2. The high-voltage power supply unit 130 is electrically connected to the detection roller 110 and the counter roller 120. In this regard, an electric circuit is formed by the detection roller 110, the counter roller 120, and the high-voltage power supply unit 130.

The high-voltage power supply unit 130 includes a current detector 131 and a high-voltage power supply circuit 132.

The current detector 131 is electrically connected to the detection roller 110. The current detector 131 detects a current caused to flow by the voltage applied by the high-voltage power supply circuit 132.

The high-voltage power supply circuit 132 is electrically connected to the detection roller 110 via the current detector 131. The high-voltage power supply circuit 132 can apply a high voltage. The high-voltage power supply circuit 132 applies voltage to the detection roller 110 via the current detector 131. The high-voltage power supply circuit 132 can apply a high voltage of 1 to 5 kV, for example. The high-voltage power supply circuit 132 may apply one type of voltage to the sheet 2 or apply a plurality of types of voltages to the sheet 2 a plurality of times, as a method of voltage application.

The controller 140 is communicably connected to the current detector 131. The controller 140 is provided to be able to control various conditions for forming an image in the image forming apparatus 30 by determining sheet characteristics from the electrical resistance value received from the current detector 131.

The operation of the detector 100 will be described. First, the detection roller 110 and the counter roller 120 are rotated in reverse directions to sandwich the sheet 2 between the detection roller 110 and the counter roller 120. The rotation of the detection roller 110 and the counter roller 120 is stopped with the detection roller 110 and the counter roller 120 sandwiching the sheet 2, and the movement of the sheet 2 is stopped, accordingly. Then, voltage is applied from the high-voltage power supply circuit 132 to the sheet 2. The current detector 131 detects a current value upon application of the voltage, and calculates an electrical resistance value of the sheet 2 according to Ohm's law. The controller 140 reads the electrical resistance value, and controls various conditions for forming an image in the image forming apparatus 30 from the result of the electrical resistance value.

Figure 3:
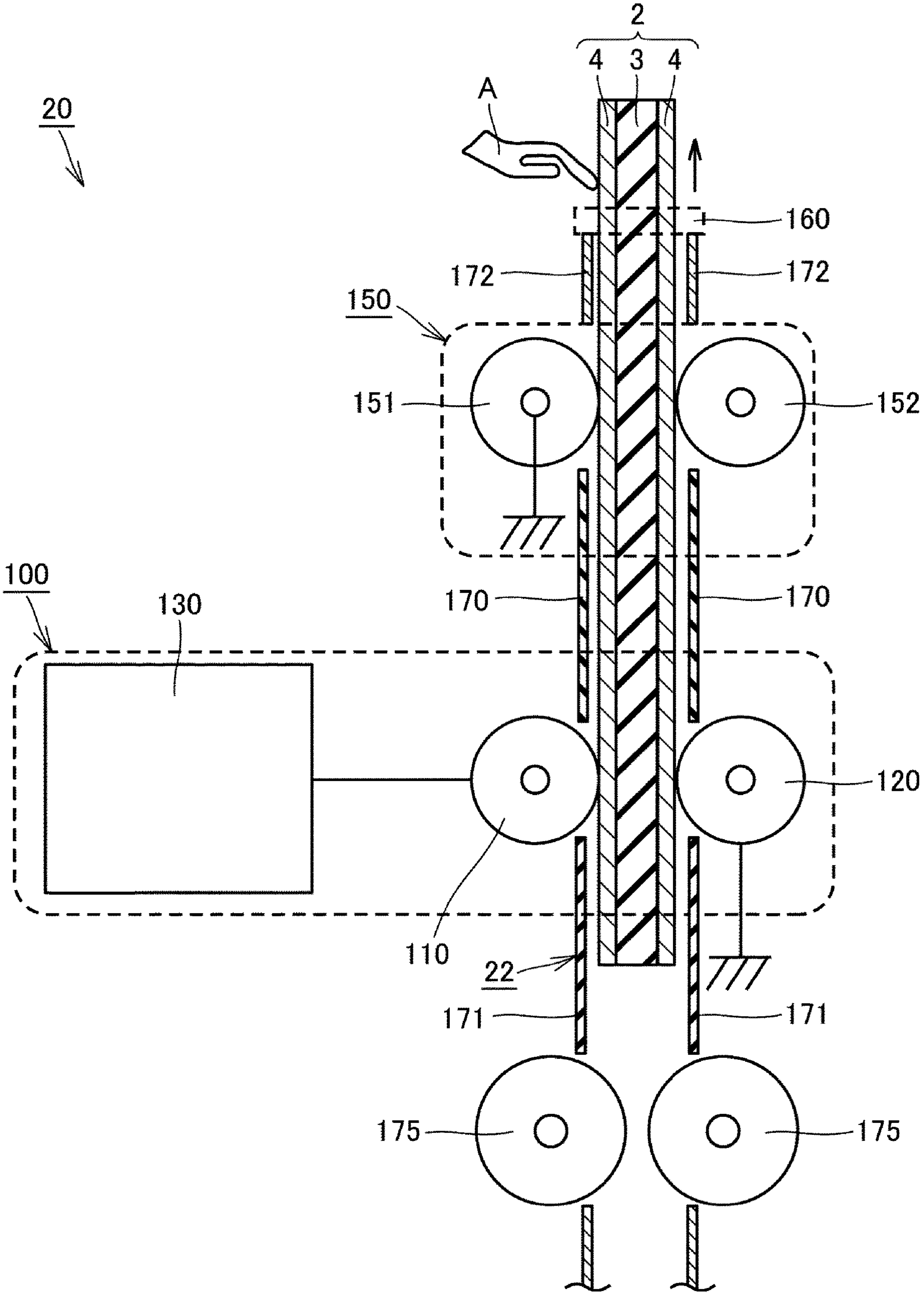
FIG. 3 is a schematic view illustrating a configuration around the detector and a charge neutralizer of the sheet characteristic detection device according to the first embodiment of the present invention.

FIG. 3 is a schematic view illustrating a configuration around the detector and the charge neutralizer of the sheet characteristic detection device according to the first embodiment of the present invention.

As illustrated in FIG. 3, the sheet 2 in the first embodiment is formed by a plurality of layers. Specifically, the sheet 2 includes a base layer 3 and coating layers 4. The base layer 3 is made of paper. The coating layers 4 are disposed on both surfaces of the base layer 3. The coating layers 4 are made of a conductive member such as aluminum. The coating layer does not necessarily need to be provided.

The detector 100 and the sheet ejector 160 are disposed such that the sheet 2 is contactable with the detector 100 and the sheet ejector 160 simultaneously. Specifically, the detector 100 and the sheet ejector 160 are disposed such that the sheet 2 in every sheet size is contactable with the detector 100 and the sheet ejector 160 simultaneously.

The charge neutralizer 150 includes a first roller 151 and a second roller 152. The first roller 151 and the second roller 152 sandwich the sheet 2 in a direction intersecting a direction in which the sheet 2 is ejected. The first roller 151 and the second roller 152 have conductivity. The first roller 151 is grounded.

The sheet characteristic detection device 20 according to the first embodiment further includes a first insulating member 170, a second insulating member 171, and a conductive member 172. Specifically, the first insulating member 170, the second insulating member 171, and the conductive member 172 are disposed on the sheet ejection path 22 of the sheet characteristic detection device 20.

The first insulating member 170 forms at least a part of the sheet ejection path 22 disposed between the detector 100 and the charge neutralizer 150. The first insulating member 170 according to the first embodiment forms the entire path between the detector 100 and the charge neutralizer 150 of the sheet ejection path 22. The first insulating member 170 is made of, for example, a resin material.

The second insulating member 171 forms at least a part of the sheet ejection path 22 disposed on an upstream side of the detector 100. The second insulating member 171 according to the first embodiment forms a path between the detector 100 and the conveyance rollers 175 nearest to the detector 100 side of the sheet ejection path 22 disposed on an upstream side of the detector 100. The second insulating member 171 is made of, for example, a resin material.

The first insulating member 170 may form a part of the sheet ejection path between the detector 100 and the charge neutralizer 150, and the rest of the path may be formed by other members. The same configuration as that of the first insulating member 170 is applicable to the second insulating member 171.

Since the sheet ejection path 22 between the detector 100 and the charge neutralizer 150 is formed by the first insulating member 170 and the sheet ejection path 22 disposed on the upstream side of the detector 100 is formed by the second insulating member 171, the current can easily flow to the counter roller 120 side upon application of the voltage to the sheet 2 by the high-voltage power supply unit 130 of the detector 100. This configuration reduces leakage current from the detector 100 to other components. This configuration also improves the detection accuracy of the sheet characteristics by the detector 100.

The conductive member 172 forms at least a part of the sheet ejection path 22 disposed on a downstream side of the charge neutralizer 150. The conductive member 172 in the first embodiment forms the entire path of the sheet ejection path 22 from the charge neutralizer 150 to the sheet ejector 160. The conductive member 172 is made of, for example, a metal material such as aluminum or iron.

Since the sheet ejection path 22 from the charge neutralizer 150 to the sheet ejector 160 is formed by the conductive member 172, the electric charge accumulated on the sheet 2 is discharged by the conductive member 172, thereby the sheet 2 can be neutralized more effectively in addition to the neutralization of the sheet 2 in the charge neutralizer 150.

The conductive member 172 is disposed on the downstream side of the charge neutralizer 150 away from the detector 100. Thus, the conductive member 172 has little influence on the accuracy of detecting the sheet characteristics by the detector 100. This configuration allows the conductive member 172 to be made of a sheet metal or the like whose manufacturing cost is lower than that of the first insulating member 170 or the second insulating member 171, thereby reducing the manufacturing costs of the sheet characteristic detection device 20.

Figure 4:
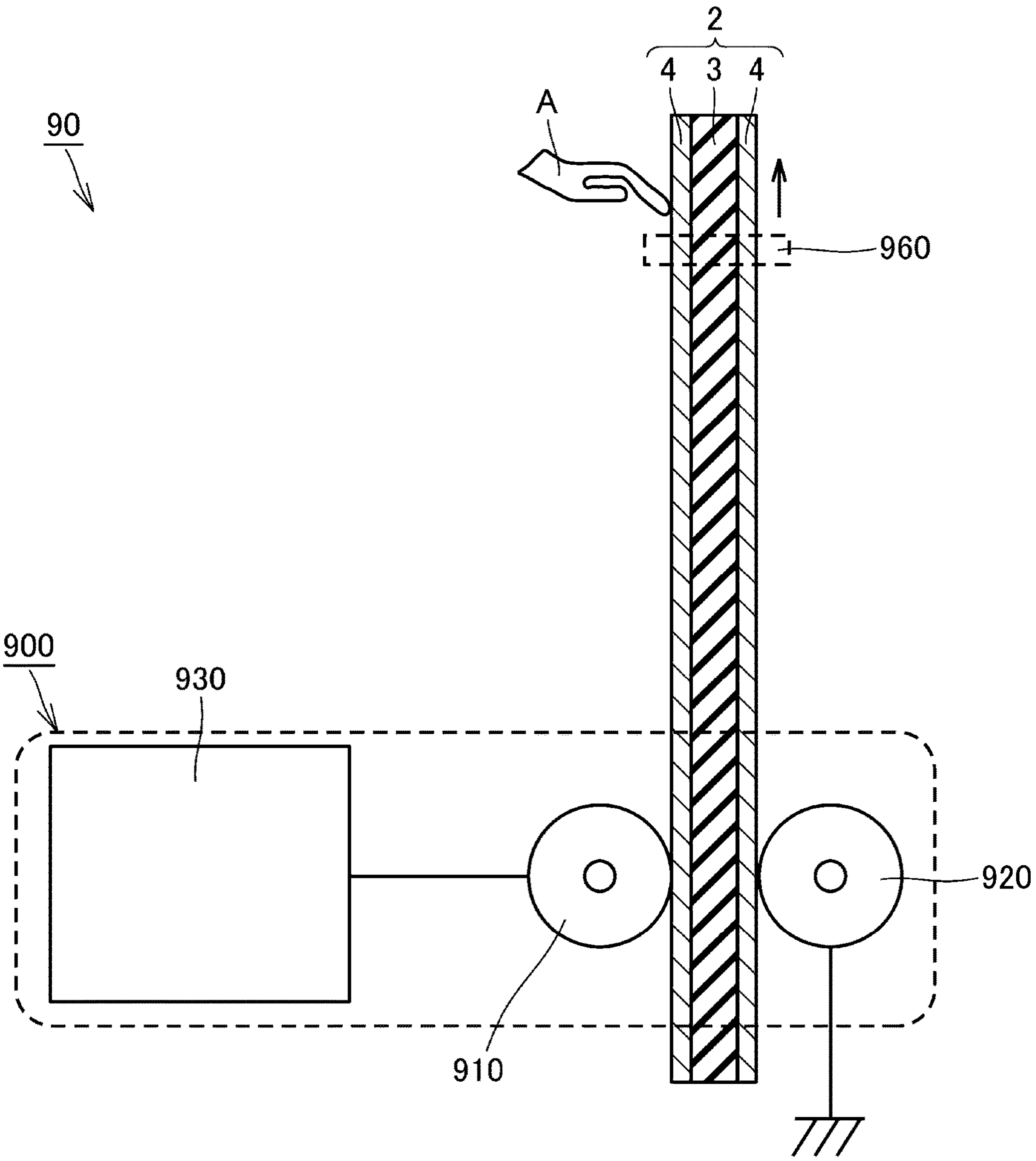
FIG. 4 is a schematic view illustrating a configuration around a detector of a sheet characteristic detection device according to a comparative example.

FIG. 4 is a schematic view illustrating a configuration around a detector of a sheet characteristic detection device according to a comparative example. As illustrated in FIG. 4, this sheet characteristic detection device 90 according to the comparative example differs from the sheet characteristic detection device 20 according to the first embodiment in that it has no charge neutralizer.

The sheet characteristic detection device 90 includes a detector 900 and a sheet ejector 960. The detector 900 includes a detection roller 910, a counter roller 920, and a high-voltage power supply unit 930. The high-voltage power supply unit 930 applies a high voltage to the sheet 2 via the detection roller 910 and the counter roller 920. The sheet 2 is ejected from the sheet ejector 960.

In the sheet characteristic detection device 90 according to the comparative example, there is a risk that electric shock occurs to the user if a hand A of the user touches the sheet 2 to which a high voltage is applied and through which a current flows. Furthermore, when the top layer of the sheet 2 is covered with a coating layer 4, the surface resistance on the top layer of the sheet 2 is small and the risk of electric shock is increased.

As illustrated in FIG. 3, however, the sheet characteristic detection device 20 according to the first embodiment is provided with the charge neutralizer 150 between the detector 100 and the sheet ejector 160 on the sheet ejection path 22 of the sheet characteristic detection device 20. If the user touches the charged sheet 2 with the hand A after the sheet 2 is charged by application of a high voltage by the high-voltage power supply unit 130 of the detector 100 to detect sheet characteristics, the charge neutralizer 150 has neutralized the electric charge on the sheet 2 and thus prevents electric shock from occurring to the user.

Figure 5:
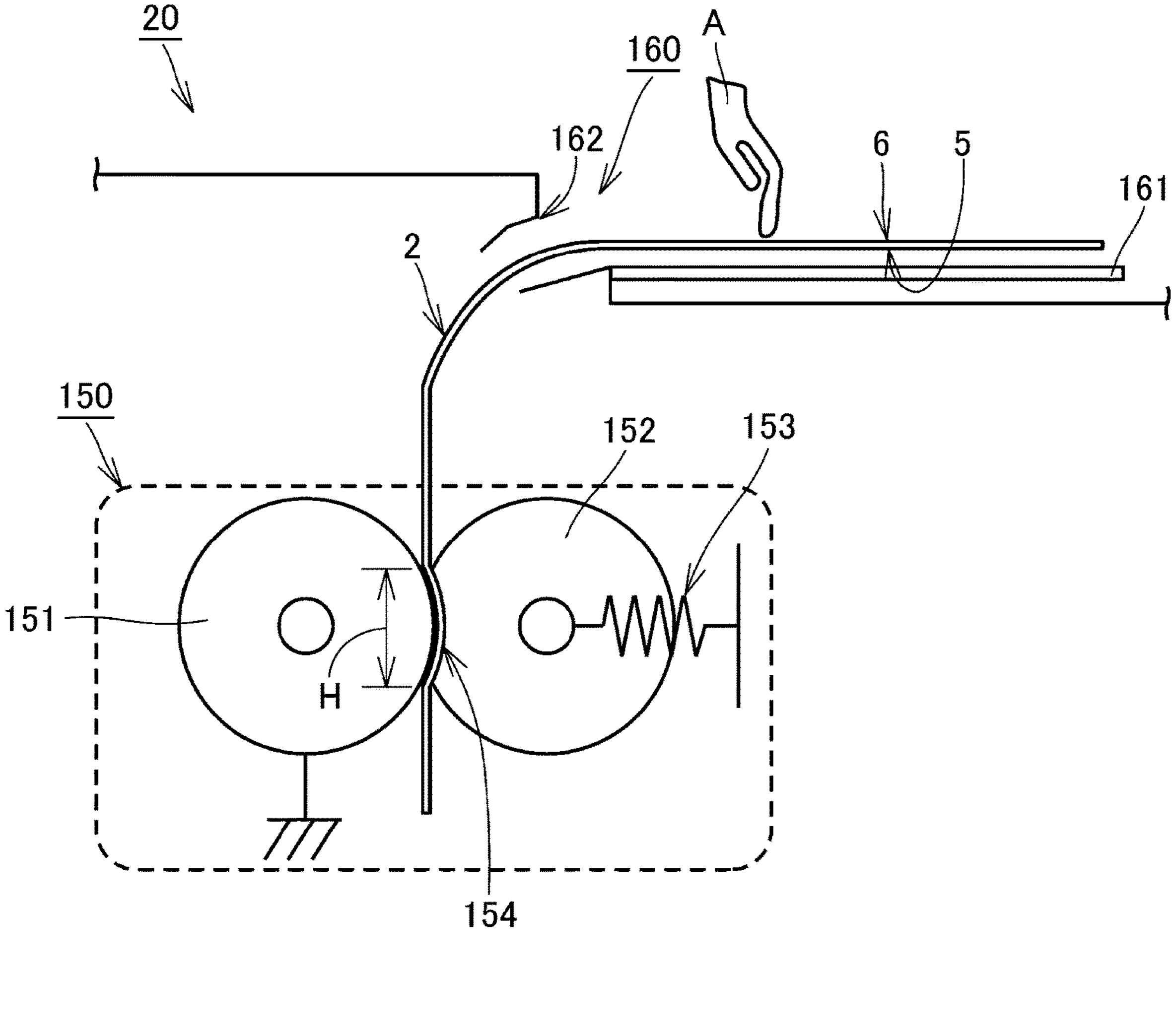
FIG. 5 is a schematic view illustrating a configuration around the charge neutralizer and a sheet ejector of the sheet characteristic detection device according to the first embodiment of the present invention.

FIG. 5 is a schematic view illustrating a configuration around the charge neutralizer and the sheet ejector of the sheet characteristic detection device according to the first embodiment of the present invention.

As illustrated in FIG. 5, the first roller 151 of the charge neutralizer 150 is made of metal. The second roller 152 has elasticity.

The charge neutralizer 150 further includes a spring 153. The spring 153 biases the second roller 152 against the first roller 151. Pressing the second roller 152 against the first roller 151 deforms the second roller 152, and the first roller 151 is in surface contact with the sheet 2.

Bringing the first roller 151 into surface contact with the sheet 2 creates a nip portion 154 on the first roller 151. This configuration can increase the neutralizing area of the first roller 151, and the sheet 2 can be neutralized more effectively. It is preferred that the nip portion 154 has a nip width H of about 3 mm, for example.

In the first embodiment, the spring 153 presses the second roller 152 against the first roller 151, but the first embodiment is not limited to this configuration. In the configuration in which the second roller 152 is pressed against the first roller 151, the second roller 152 may be pressed by other elastic members or the like. The first embodiment may also have a configuration in which the first roller 151 is pressed against the second roller 152.

The sheet ejector 160 has a sheet ejection port 162. The sheet 2 is ejected from the sheet ejection port 162 to the ejection tray 161. The sheet 2 is ejected with a first sheet surface 5 facing the ejection tray 161 and a second sheet surface 6 opposite to the first sheet surface 5 facing a side to which the user touches.

Since the first roller 151 is made of metal, the charge neutralizer 150 efficiently neutralizes the electric charge on the second sheet surface 6 of the sheet 2 opposite to the first sheet surface 5 facing the ejection tray 161. This configuration can neutralize the second sheet surface 6 of the sheet 2 that is more likely to be touched by the user with the hand A, when the sheet 2 is ejected.

In the sheet characteristic detection device 20 according to the first embodiment of the present invention, the charge neutralizer 150 disposed on the downstream side of the detector 100 on the sheet ejection path 22 through which the sheet 2 is ejected can remove the charge on the sheet 2 accumulated by the current upon application of the high voltage by the detector 100. This configuration can prevent electric shock from occurring to the user touching the sheet 2 when sheet characteristics are detected by application of voltage to the sheet 2.

The sheet characteristic detection device 20 according to the first embodiment of the present invention includes the detector 100 and the sheet ejector 160 disposed at a distance at which the sheet 2 is contactable with the detector 100 and the sheet ejector 160 simultaneously. This configuration can reduce the size of the device.

In the sheet characteristic detection device 20 according to the first embodiment of the present invention, the detector 100 and the sheet ejector 160 are disposed at a distance at which the sheet 2 in any applicable sheet size is contactable with the detector 100 and the sheet ejector 160 simultaneously. This configuration can reduce the size of the device while allowing the device to use a plurality of types of sheet sizes.

In the sheet characteristic detection device 20 according to the first embodiment of the present invention, at least a part of the sheet ejection path 22 between the detector 100 and the charge neutralizer 150 is formed by the first insulating member 170. This configuration can reduce leakage current from the detector 100 to the charge neutralizer 150. This configuration can also improve the detection accuracy of the electrical resistance value by the detector 100.

In the sheet characteristic detection device 20 according to the first embodiment of the present invention, the sheet ejection path 22 disposed on the downstream side of the charge neutralizer 150 is formed by the conductive member 172. The charge accumulated on the sheet 2 is discharged by the conductive member 172, and the sheet 2 can be neutralized more effectively. Since the conductive member 172 disposed on the downstream side of the charge neutralizer 150 is made of a sheet metal or the like whose manufacturing cost is lower than that of the insulating member, the sheet characteristic detection device 20 can be manufactured at a lower cost.

In the sheet characteristic detection device 20 according to the first embodiment of the present invention, at least a part of the sheet ejection path 22 disposed on the upstream side of the detector 100 is formed by the second insulating member 171. This configuration can reduce leakage current flowing from the detector 100 to the upstream side of the sheet ejection path 22. This configuration can also improve the detection accuracy of the electrical resistance value by the detector 100.

The sheet characteristic detection device 20 according to the first embodiment of the present invention neutralizes the electric charge on the second sheet surface 6 of the sheet 2 to be touched by the user with the hand A when the sheet 2 is ejected to the ejection tray 161. This configuration can prevent electric shock more effectively.

In the sheet characteristic detection device 20 according to the first embodiment of the present invention, the charge neutralizer 150 includes the first roller 151 made of metal and the second roller 152 having elasticity, and the second roller 152 is pressed against the first roller 151 to bring the first roller 151 into surface contact with the sheet 2. This configuration allows the first roller 151 to eliminate electric charge on the sheet 2 more easily and the sheet 2 can be neutralized more effectively by the charge neutralizer 150.

In the image forming system 1 according to the first embodiment of the present invention, the sheet ejection path 22 is separated from the first conveyance path 21 through which the sheet 2 is fed to the image forming apparatus 30. This configuration can reduce the influence of the high voltage applied by the detector 100 on other sensors and the like disposed in the image forming apparatus 30.

Second Embodiment

The following describes an image forming system according to a second embodiment of the present invention. The image forming system according to the second embodiment of the present invention differs from the image forming system 1 according to the first embodiment of the present invention mainly in the arrangement of the sheet characteristic detection device and the image forming apparatus, and the description of the same configurations as those of the image forming system 1 according to the first embodiment of the present invention will not be repeated.

Figure 6:
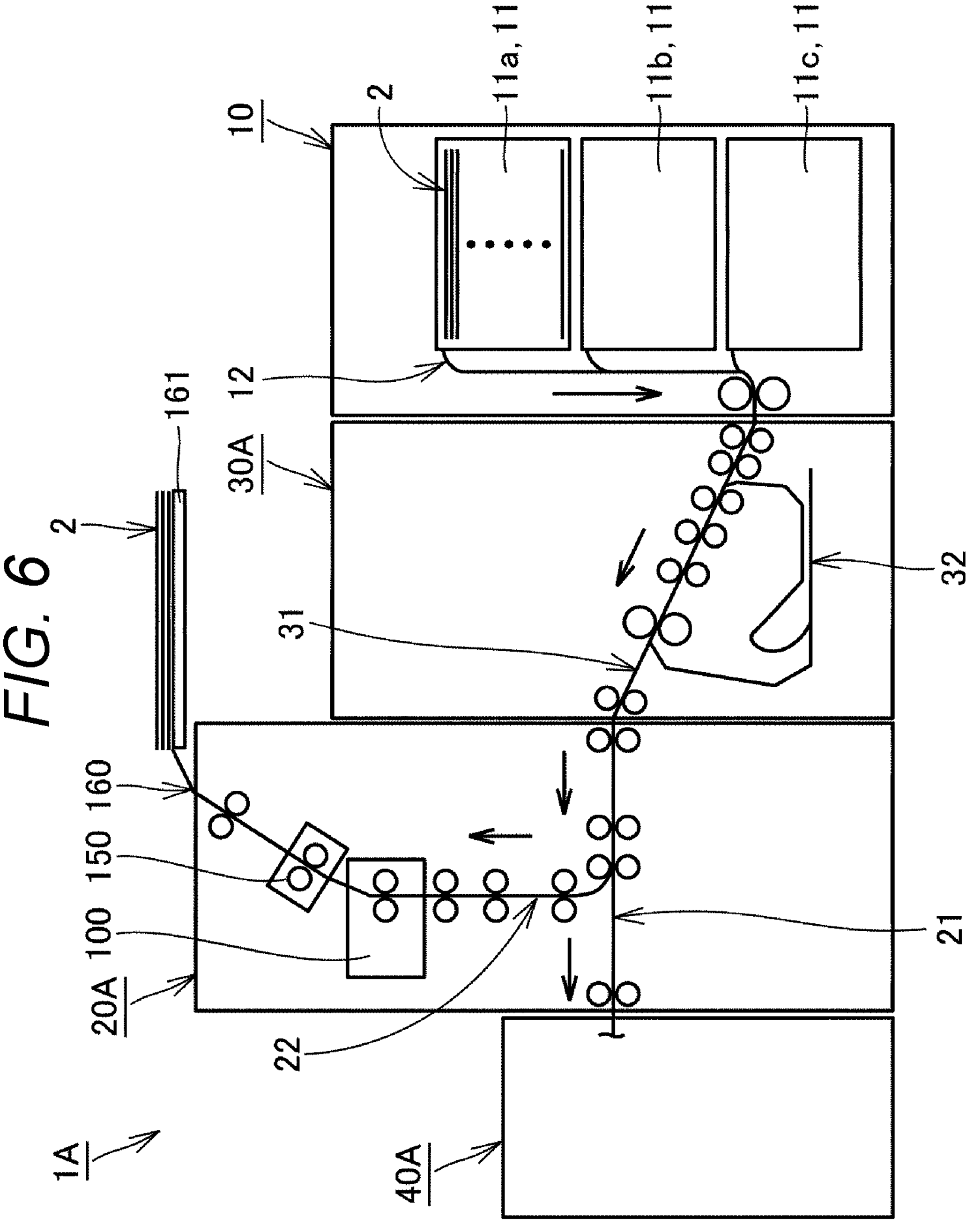
FIG. 6 is a schematic view illustrating a configuration of an image forming system according to a second embodiment of the present invention.

FIG. 6 is a schematic view illustrating a configuration of the image forming system according to the second embodiment of the present invention. As illustrated in FIG. 6, this image forming system 1A according to the second embodiment includes the sheet feeding device 10, a sheet characteristic detection device 20A, an image forming apparatus 30A, and a post-processing apparatus 40A.

The sheet characteristic detection device 20A according to the second embodiment is disposed on a downstream side of the image forming apparatus 30A in the sheet path. In other words, the sheet ejection path 22 in the sheet characteristic detection device 20A is disposed the downstream side of the image forming apparatus 30A.

The sheet characteristic detection device 20A detects physical properties, such as electrical resistance, of the sheet 2 ejected from the image forming apparatus 30A.

The sheet 2 conveyed in the sheet characteristic detection device 20A is conveyed through the sheet ejection path 22 separated from the first conveyance path 21 in the sheet characteristic detection device 20A before being conveyed to the post-processing apparatus 40A on the downstream side. The sheet ejected to the sheet ejection path 22 may be treated as a printed product.

The sheet conveyed along the first conveyance path 21 is conveyed to the post-processing apparatus 40A without passing through the detector 100 or the charge neutralizer 150. In the post-processing apparatus 40A, processing such as stapling and coupling of a plurality of sheets 2 is performed.

In the sheet characteristic detection device 20A according to the second embodiment of the present invention, in the same manner as in the first embodiment, the charge neutralizer 150 disposed on the downstream side of the detector 100 on the sheet ejection path 22 through which the sheet 2 is ejected can remove the charge on the sheet 2 accumulated by the current upon application of the high voltage by the detector 100. This configuration can prevent electric shock from occurring to the user touching the sheet 2 when sheet characteristics are detected by application of voltage to the sheet 2.

In the image forming system 1A according to the second embodiment of the present invention, the sheet ejection path 22 is separated from the first conveyance path 21 through which the sheet 2 is fed to the post-processing apparatus 40A. This configuration can reduce the influence of the high voltage applied by the detector 100 on other devices such as the post-processing apparatus 40A.

Third Embodiment

The following describes an image forming apparatus according to a third embodiment of the present invention. The image forming apparatus according to the third embodiment of the present invention differs from the image forming system 1 according to the first embodiment of the present invention in the positional relation of the configurations, and the description of the same configurations as those of the image forming system 1 according to the first embodiment of the present invention will not be repeated.

Figure 7:
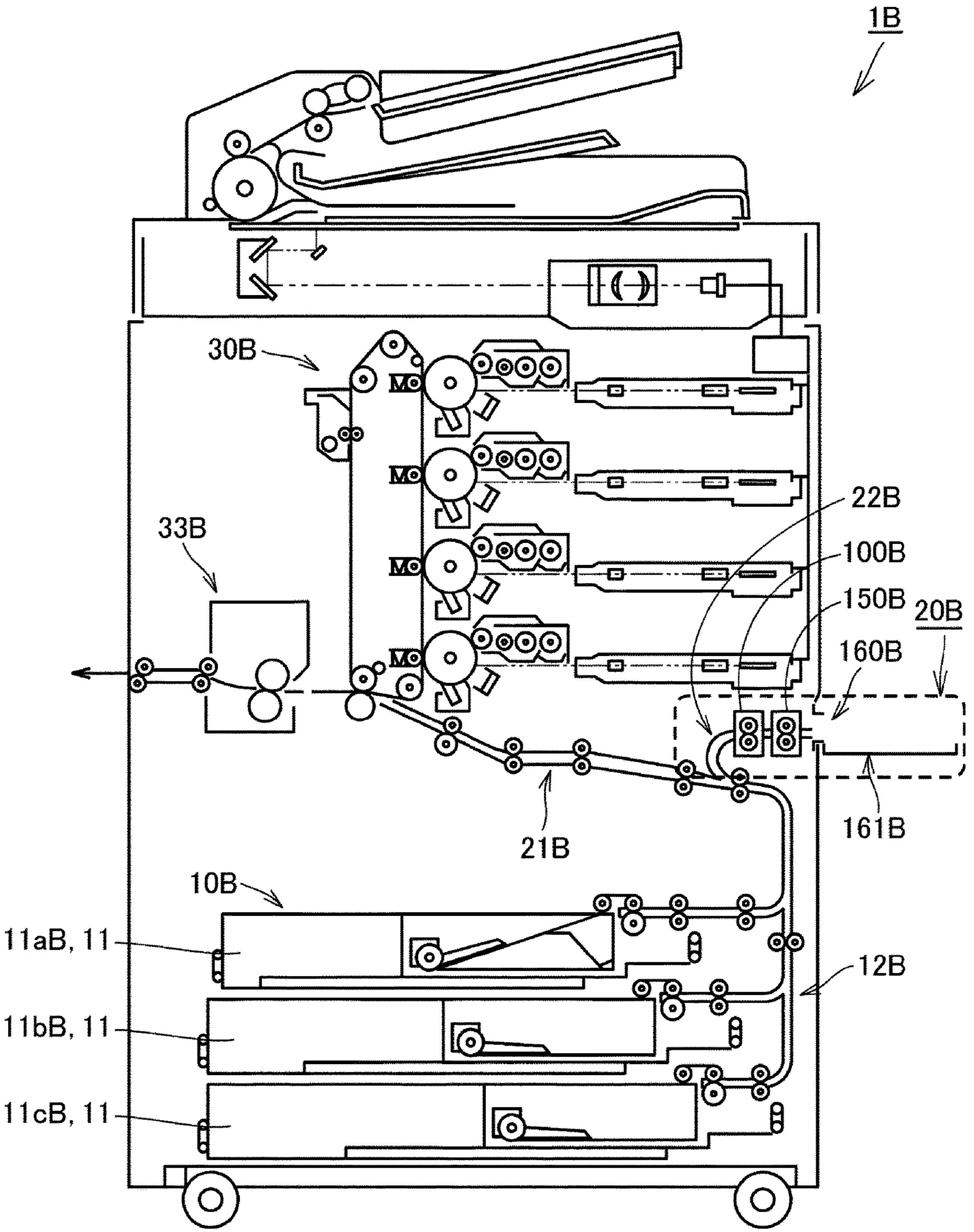
FIG. 7 is a schematic view illustrating a configuration of an image forming apparatus according to a third embodiment of the present invention.

FIG. 7 is a schematic view illustrating a configuration of the image forming apparatus according to the third embodiment of the present invention. As illustrated in FIG. 7, this image forming apparatus 1B is an office machine used in fields such as general office work. The image forming apparatus 1B according to the third embodiment includes a sheet feeder 10B, a sheet characteristic detector 20B, an image former 30B and a fixer 33B.

The sheet feeder 10B includes sheet feeding cassettes 11B. Sheets are supplied from three sheet feeding cassettes 11*a*B, 11*b*B, and 11*c*B through a sheet feeding path 12B to the downstream side of the sheet path.

In the sheet path of the sheets, the sheet feeding path 12B bifurcates into a first conveyance path 21B and a sheet ejection path 22B. The sheet conveyed through the first conveyance path 21B is conveyed to the image former 30B. To the sheet that has passed through the image former 30B, a subject to be printed is fixed in the fixer 33B. The sheet is then conveyed to a device such as a post-processing apparatus, or ejected to the outside of the image forming apparatus 1B as a printed product.

The sheet characteristic detector 20B includes the sheet ejection path 22B. The sheet is ejected through the sheet ejection path 22B to the outside of the image forming apparatus 1B without passing through the image former 30B.

On the sheet ejection path 22B through which the sheet is ejected, a detector 100B, a charge neutralizer 150B, and a sheet ejector 160B are disposed. The detector 100B detects the electrical resistance value of the sheet. This configuration allows the sheet characteristic detector 20B to detect sheet properties. The charge neutralizer 150B is disposed on a downstream side of the detector 100B on the sheet ejection path 22B, and neutralizes the sheet. The sheet ejected from the sheet ejector 160B is placed on an ejection tray 161B.

In the image forming apparatus 1B according to the third embodiment of the present invention, the charge neutralizer 150B disposed on a downstream side of the detector 100B on the sheet ejection path 22B of the sheet characteristic detector 20B through which the sheet is ejected without passing through the image former 30B can remove the charge on the sheet accumulated by the current upon application of the high voltage by the detector 100B. This configuration can prevent electric shock from occurring to the user touching the sheet when sheet characteristics are detected by application of voltage to the sheet.

Fourth Embodiment

The following describes an image forming apparatus according to a fourth embodiment of the present invention. The image forming apparatus according to the fourth embodiment of the present invention differs from the image forming apparatus 1B according to the third embodiment of the present invention in the configuration of the sheet characteristic detector, and the description of the same configurations as those of the image forming apparatus 1B according to the third embodiment of the present invention will not be repeated.

Figure 8:
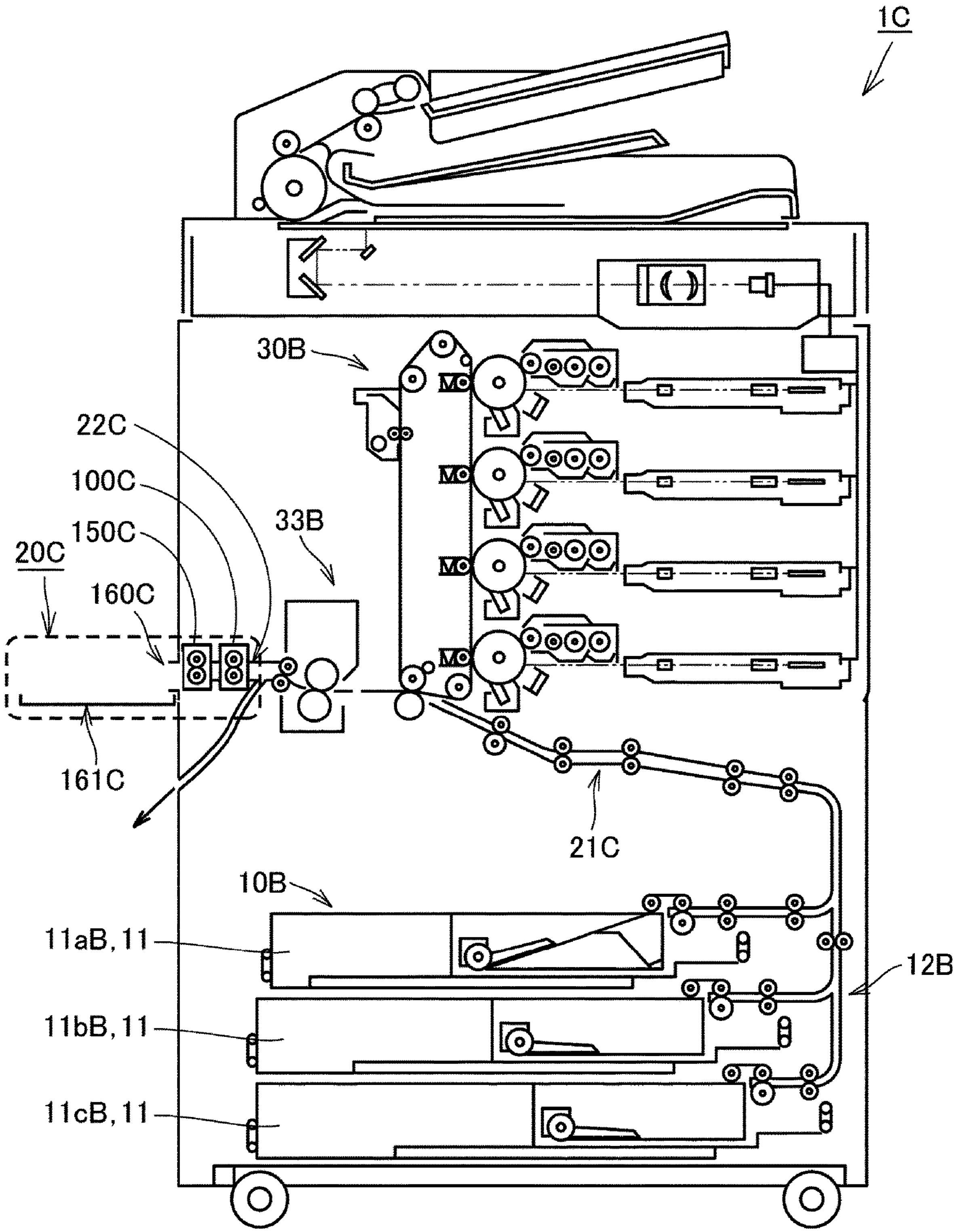
FIG. 8 is a schematic view illustrating a configuration of an image forming apparatus according to a fourth embodiment of the present invention.

FIG. 8 is a schematic view illustrating a configuration of the image forming apparatus according to the fourth embodiment of the present invention. As illustrated in FIG. 8, this image forming apparatus 1C according to the fourth embodiment includes the sheet feeder 10B, a sheet characteristic detector 20C, the image former 30B and the fixer 33B.

The sheet characteristic detector 20C is disposed on a downstream side of the image former 30B and the fixer 33B in the sheet path.

On a sheet ejection path 22C through which the sheet is ejected, a detector 100C, a charge neutralizer 150C, and a sheet ejector 160C are disposed. The detector 100C detects the electrical resistance value of the sheet. This configuration allows the sheet characteristic detector 20C to detect sheet properties. The charge neutralizer 150C is disposed a downstream side of the detector 100C on the sheet ejection path 22C, and neutralizes the sheet. The sheet ejected from the sheet ejector 160C is placed on an ejection tray 161C.

The sheet conveyed along a first conveyance path 21C is conveyed to the image former 30B without passing through the detector 100C or the charge neutralizer 150C.

In the image forming apparatus 1C according to the fourth embodiment of the present invention, in the same manner as in the first embodiment, the charge neutralizer 150C disposed on a downstream side of the detector 100C on the sheet ejection path 22C through which the sheet is ejected can remove the charge on the sheet accumulated by the current upon application of the high voltage by the detector 100C. This configuration can prevent electric shock from occurring to the user touching the sheet when sheet characteristics are detected by application of voltage to the sheet.

Supplementary Notes

As described above, the embodiments include the following aspects.

Aspect 1

A sheet characteristic detection device comprising:

a detector that is disposed on a sheet ejection path through which a sheet is ejected and that detects an electrical resistance value of the sheet; and a charge neutralizer that is disposed on a downstream side of the detector on the sheet ejection path and that neutralizes electric charge on the sheet.

Aspect 2

The sheet characteristic detection device according to aspect 1, further comprising a sheet ejector that is disposed at an end of the sheet ejection path and that ejects the sheet to outside of the sheet characteristic detection device, wherein the detector and the sheet ejector are disposed such that the sheet is contactable with the detector and the sheet ejector simultaneously, and the charge neutralizer is disposed between the detector and the sheet ejector.

Aspect 3

The sheet characteristic detection device according to aspect 2, wherein the sheet includes sheets in a plurality of sheet sizes, and the detector and the sheet ejector are disposed such that the sheet in any of the plurality of sheet sizes is contactable with the detector and the sheet ejector simultaneously.

Aspect 4

The sheet characteristic detection device according to any one of aspects 1 to 3, further comprising a first insulating member that forms at least a part of the sheet ejection path between the detector and the charge neutralizer.

Aspect 5

The sheet characteristic detection device according to any one of aspects 2 to 4, further comprising a conductive member that forms at least a part of the sheet ejection path disposed on a downstream side of the charge neutralizer.

Aspect 6

The sheet characteristic detection device according to any one of aspects 1 to 5, further comprising a second insulating member that forms at least a part of the sheet ejection path disposed on an upstream side of the detector.

Aspect 7

The sheet characteristic detection device according to any one of aspects 2 to 6, further comprising an ejection tray on which the sheet ejected from the sheet ejection path is placed, wherein the sheet includes a first sheet surface facing the ejection tray and a second sheet surface opposite to the first sheet surface, and the charge neutralizer neutralizes electric charge on the second sheet surface.

Aspect 8

The sheet characteristic detection device according to any one of aspects 1 to 7, wherein the charge neutralizer includes a first roller made of metal and a second roller having elasticity, the first roller and the second roller sandwiching the sheet in a direction intersecting a direction in which the sheet is ejected, and the second roller is pressed against the first roller and deformed to allow the first roller to be in surface contact with the sheet.

Aspect 9

An image forming system comprising:

the sheet characteristic detection device according to any one of aspects 1 to 3; and an image forming apparatus that forms an image on the sheet, wherein the sheet characteristic detection device includes a conveyance path that conveys the sheet to the image forming apparatus, and the sheet ejection path separated from the conveyance path on an upstream side of the image forming apparatus.

Aspect 10

An image forming system comprising:

the sheet characteristic detection device according to any one of aspects 1 to 3; and an image forming apparatus that forms an image on the sheet, wherein the sheet ejection path of the sheet characteristic detection device is disposed on the downstream side of the image forming apparatus.

Aspect 11

An image forming apparatus comprising:

an image former that forms an image on a sheet;

a sheet characteristic detector that detects a characteristic of the sheet, wherein the sheet characteristic detector includes a detector that is disposed on a sheet ejection path through which the sheet is ejected and that detects an electrical resistance value of the sheet, and a charge neutralizer that is disposed on a downstream side of the detector on the sheet ejection path and that neutralizes electric charge on the sheet.

Although embodiments of the present invention have been described and illustrated in detail, the disclosed embodiments are made for purposes of illustration and example only and not limitation. The scope of the present invention should be interpreted by terms of the appended claims, and is not to be construed only by the above-described embodiments. Furthermore, meanings equivalent to the claims and all modifications within the scope are included. In the description of the above-described embodiments, combinable configurations may be combined with one another.

What is claimed is:

1. A sheet characteristic detection device comprising:

a detector that is disposed on a sheet ejection path through which a sheet is ejected and that detects an electrical resistance value of the sheet;

a charge neutralizer that is disposed on a downstream side of the detector on the sheet ejection path and that neutralizes electric charge on the sheet; and a sheet ejector that is disposed at an end of the sheet ejection path and that ejects the sheet to outside of the sheet characteristic detection device, wherein the detector and the sheet ejector are disposed such that the sheet is contactable with the detector and the sheet ejector simultaneously, and the charge neutralizer is disposed between the detector and the sheet ejector.

2. The sheet characteristic detection device according to claim 1, wherein the sheet includes sheets in a plurality of sheet sizes, and the detector and the sheet ejector are disposed such that the sheet in any of the plurality of sheet sizes is contactable with the detector and the sheet ejector simultaneously.

3. The sheet characteristic detection device according to claim 1, further comprising a first insulating member that forms at least a part of the sheet ejection path between the detector and the charge neutralizer.

4. The sheet characteristic detection device according to claim 1, further comprising a conductive member that forms at least a part of the sheet ejection path disposed on a downstream side of the charge neutralizer.

5. The sheet characteristic detection device according to claim 1, further comprising a second insulating member that forms at least a part of the sheet ejection path disposed on the upstream side of the detector.

6. The sheet characteristic detection device according to claim 1, further comprising an ejection tray on which the sheet ejected from the sheet ejection path is placed, wherein the sheet includes a first sheet surface facing the ejection tray and a second sheet surface opposite to the first sheet surface, and the charge neutralizer neutralizes electric charge on the second sheet surface.

7. The sheet characteristic detection device according to claim 1, wherein the charge neutralizer includes a first roller made of metal and a second roller having elasticity, the first roller and the second roller sandwiching the sheet in a direction intersecting a direction in which the sheet is ejected, and the second roller is pressed against the first roller and deformed to allow the first roller to be in surface contact with the sheet.

8. An image forming system comprising:

the sheet characteristic detection device according to claim 1; and an image forming apparatus that forms an image on the sheet, wherein the sheet characteristic detection device includes a conveyance path that conveys the sheet to the image forming apparatus, and the sheet ejection path separated from the conveyance path on an upstream side of the image forming apparatus.

9. An image forming system comprising:

the sheet characteristic detection device according to claim 1; and an image forming apparatus that forms an image on the sheet, wherein the sheet ejection path of the sheet characteristic detection device is disposed on the downstream side of the image forming apparatus.

10. An image forming apparatus comprising:

an image former that forms an image on a sheet;

a sheet characteristic detector that detects a characteristic of the sheet, wherein the sheet characteristic detector includes a detector that is disposed on a sheet ejection path through which the sheet is ejected and that detects an electrical resistance value of the sheet, and a charge neutralizer that is disposed on the downstream side of the detector on the sheet ejection path and that neutralizes electric charge on the sheet; and a sheet ejector that is disposed at an end of the sheet ejection path and that ejects the sheet to outside of the sheet characteristic detection device, wherein the detector and the sheet ejector are disposed such that the sheet is contactable with the detector and the sheet ejector simultaneously, and the charge neutralizer is disposed between the detector and the sheet ejector.

* * * * *